US011486743B2

(12) United States Patent
Aubas et al.

(10) Patent No.: US 11,486,743 B2
(45) Date of Patent: Nov. 1, 2022

(54) ELECTRONIC COMPONENT FOR A MOTOR VEHICLE

(71) Applicant: Valeo Systemes Thermiques, Le Mesnil Saint-Denis (FR)

(72) Inventors: Benoît Aubas, Le Mesnil Saint-Denis (FR); Abdel Mesnaoui, Le Mesnil Saint-Denis (FR)

(*) Notice: Subject to any disclaimer, the term of this patent is extended or adjusted under 35 U.S.C. 154(b) by 0 days.

(21) Appl. No.: 17/282,546

(22) PCT Filed: Sep. 26, 2019

(86) PCT No.: PCT/FR2019/052278
§ 371 (c)(1),
(2) Date: Apr. 2, 2021

(87) PCT Pub. No.: WO2020/070411
PCT Pub. Date: Apr. 9, 2020

(65) Prior Publication Data
US 2021/0372830 A1 Dec. 2, 2021

(30) Foreign Application Priority Data

Oct. 3, 2018 (FR) ........................................ 1859172

(51) Int. Cl.
G01N 15/00 (2006.01)
G01D 11/24 (2006.01)

(52) U.S. Cl.
CPC ........... *G01D 11/245* (2013.01); *G01N 15/00* (2013.01)

(58) Field of Classification Search
CPC .............................. G01D 11/245; G01N 15/00
See application file for complete search history.

(56) References Cited

U.S. PATENT DOCUMENTS

| 7,352,174 B1 | 4/2008 | Lee |
| 2009/0260445 A1 | 10/2009 | Kopp |
| 2015/0217495 A1 | 8/2015 | Kawasaki et al. |

FOREIGN PATENT DOCUMENTS

| CN | 101545793 A | 9/2009 |
| CN | 203221853 U | 10/2013 |
| CN | 207515814 U | 6/2018 |
| EP | 2078962 A1 | 7/2009 |

(Continued)

OTHER PUBLICATIONS

International Search Report with Written Opinion in corresponding International Application No. PCT/FR2019/052278, dated Mar. 3, 2020 (12 pages).

(Continued)

*Primary Examiner* — Jamel E Williams
(74) *Attorney, Agent, or Firm* — Osha Bergman Watanabe & Burton LLP

(57) ABSTRACT

Electronic component, in particular a sensor (1), in particular for detecting particulate matter, comprising: an electronic member, a housing (2) in which the electronic member is placed, said housing (2) comprising at least one functional opening (3a; 3b; 3c), characterised in that at least one protective shield (6a, 6b) is arranged on the housing (2) in order to protect the electronic member from the intrusion of material into the housing (2), in particular fluids or solids, which could pass through the functional opening (3a, 3b, 3c).

9 Claims, 3 Drawing Sheets

(56) References Cited

FOREIGN PATENT DOCUMENTS

EP 2105716 A1 * 9/2009 ............. G01L 19/14
EP 2105716 A1 9/2009

OTHER PUBLICATIONS

Notice of Reason for Rejection in corresponding Japanese Application No. 2021-518474, dated Jun. 7, 2022 (7 pages).
First Office Action in corresponding Chinese Application No. 201980070630.7, dated Jul. 5, 2022 (15 pages).

\* cited by examiner

ELECTRONIC COMPONENT FOR A MOTOR VEHICLE

The invention relates to an electronic component for a motor vehicle, such as a sensor for detecting particulate matter.

Equipping a motor vehicle with a sensor for detecting particulate matter is known from the document CN203221853. Such a sensor is usually placed in the interior of the motor vehicle.

"Particulate matter" is taken to mean any particle that has a sufficiently small size, usually a size less than 10 μm in diameter, to be carried in the air and to be inhaled.

Such electronic components must conform to certain standards to ensure their reliability. Among these standards, the protection rating measures the degree of resistance to intrusions of dust and water.

The invention is intended to improve the degree of resistance of such a component to intrusions of solid bodies and liquids.

To this end, the present invention proposes an electronic component, notably a sensor, notably for detecting particulate matter, comprising:
an electronic member,
a housing in which the electronic member is placed, this housing comprising:
at least one functional opening,
at least one protective shield, arranged on the housing to protect the electronic member from intrusions into the housing of matter, notably fluids or solids, which could pass through the functional opening.

Thus the shield enables at least a partial screen to be provided against liquid and solid bodies that would otherwise penetrate into the housing through the opening, being carried in the air or by flowing over the housing.

Some embodiments propose that:
the shield partially surrounds the periphery of the opening,
the periphery of the opening is closed,
the shield surrounds less than half of the periphery of the opening,
the opening is polygonal in shape and the shield surrounds at least one side of said opening,
the shield surrounds the opening in the form of a circular arc,
the shield surrounds the opening on a main side of said opening, particularly in a rectilinear manner, and partially surrounds the opening on two lateral sides of said opening, particularly in the form of a circular arc,
the shield extends on the periphery of the opening, particularly directly on said periphery, and notably on a part of said periphery,
the shield extends substantially perpendicularly to the opening,
the shield extends in an inclined manner relative to the opening,
the shield comprises a drainage channel,
the drainage channel surrounds the opening on the main side, in a rectilinear manner, and partially surrounds the opening on the lateral sides in the form of a circular arc,
the drainage channel is open at the ends of the shield,
the shield comprises an inner face directed towards the opening, and an outer face opposed to the inner face,
the drainage channel is formed on the outer face,
the housing comprises at least one wall which delimits the inside of said housing from the outside, and the shield extends in a projecting manner from said wall,
the shield extends in the prolongation of the wall,
the wall comprises a connection tube, the free end of which forms the opening,
the shield extends in the prolongation of the connection tube, particularly on a part of the periphery of the tube,
the housing comprises two half-shells, of which one is a base and one is a cover,
the shield is formed in one piece with the cover,
the shield is made in one piece with the cover,
the shield is rigid,
the shield is flexible,
the opening allows a fluid to be passed into the housing,
the opening is an air inlet,
the opening is an air outlet,
the opening enables the electronic member to be electrically connected,
the opening is an electronic connector,
the housing comprises at least three openings, including at least an air inlet, an air outlet and an electronic connector, at least one protective shield being arranged on the housing to protect the electronic member from intrusions into the housing of matter, notably fluids or solids, which could pass through at least one of the three functional openings.

The invention also relates to a motor vehicle comprising, or on which is placed, an electronic component such as that described above.

According to one embodiment, the shield is substantially above the functional opening when the electronic component is in an operational position in the vehicle.

Thus the shield forms a screen against bodies descending towards the opening, protecting it, notably, against gravitational flows.

Other characteristics and advantages of the invention will be apparent from a perusal of the following description, with reference to the attached drawings, which illustrate a particulate matter sensor by way of an example of an electronic component for the embodiment of the invention described.

Figure 1:
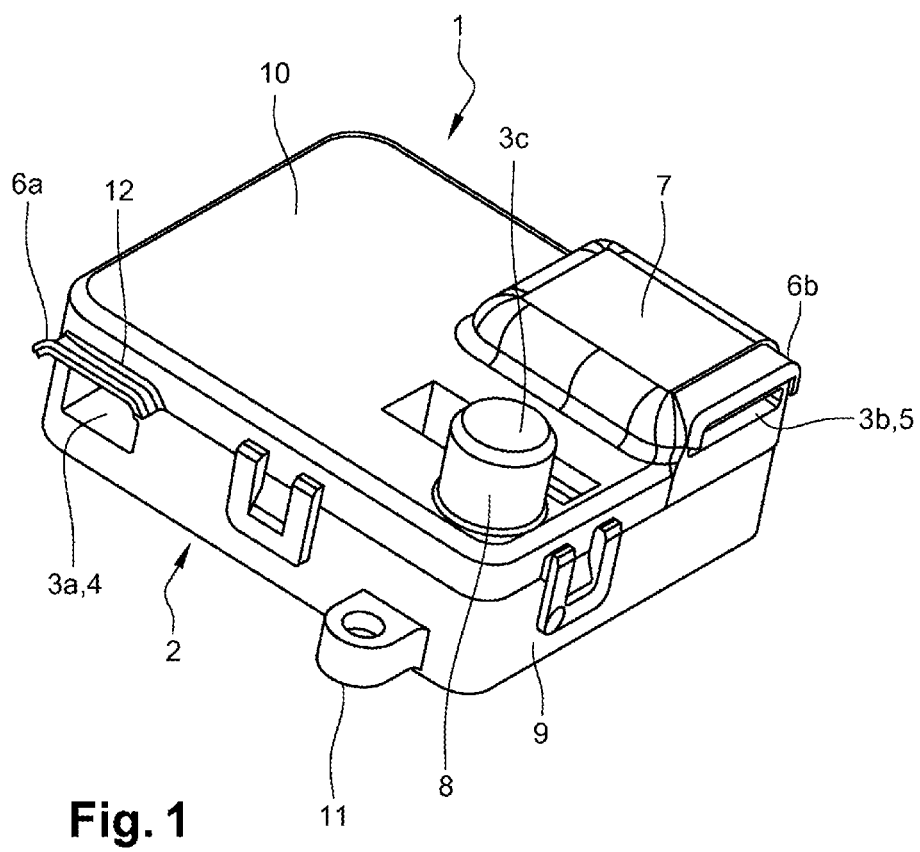
FIG. 1 shows a perspective view of a sensor for detecting particulate matter.

The sensor for detecting particulate matter 1 according to the present invention is adapted for use in a motor vehicle.

According to the invention, the sensor 1 comprises an electronic member (not shown) and a housing 2 in which the electronic member is placed.

The housing 2 comprises, notably, a particulate matter measurement chamber (not shown).

In the embodiment shown, the housing 2 comprises a first and a second functional opening 3a; 3b. The first opening 3a forms an electronic connector 4 for said sensor 1 and thus enables the electronic member to be electrically connected. The second opening 3b forms an air outlet 5 for the sensor for detecting particulate matter 1.

In the embodiment shown, a first and a second protective shield 6a; 6b partially surround the electronic connector 4 and the air outlet 5, respectively. The first and second shields 6a; 6b are each arranged on the housing 2 to protect the electronic member from intrusions into the housing 2 of matter, notably fluids or solids, which could pass through the air outlet 5 or the electronic connector 4.

Each of the shields 6a; 6b thus forms a protrusion which extends in relief beyond each of the openings 3a; 3b, thus forming an overhang on each of the openings 6a; 6b. In particular, each of the shields 6a; 6b comprises an inner face directed towards the corresponding opening 3a; 3b, and an outer face opposed to the inner face.

Thus the shields 6a; 6b enable at least a partial screen to be provided against liquid and solid bodies that would otherwise penetrate into the housing 2 through the openings 3a; 3b. These bodies are, for example, carried in the air or by flowing over the housing 2.

A wall 7 delimits the inside of the housing 2 from the outside, and each of the first and second shields 6a; 6b extends in a projecting manner from said wall 7.

In the embodiment shown, the wall 7 comprises a connection tube 8, the free end of which forms a third functional opening 3c. According to the embodiment shown, said third opening 3c forms the air inlet of the sensor 1 for detecting particulate matter. The connection tube 8 is arranged so that it can be put into fluid communication with, for example, an air supply hose (not shown).

The second and third opening 3b; 3c thus enable a fluid to be passed into the sensor 1, notably into the housing 2, notably into the particulate matter measurement chamber (not shown). The second and third openings 3b; 3c, together with the housing 2, thus define a fluid path for the air flowing into the particulate matter sensor 1.

According to an embodiment which is not shown, a third shield extends in the prolongation of the connection tube 8, particularly on a part of the periphery of the tube 8. Thus the third shield protects the third air inlet 3c from intrusions of liquid and solid bodies, without affecting the compatibility of said tube 8 with an air supply hose.

In the embodiment shown, the shields 6a; 6b are rigid, but a flexible variant of the shields 6a; 6b could also be provided.

As may be seen, in particular, in FIG. 1, the housing 2 comprises two half-shells, of which one is a base 9 and one is a cover 10.

The base receives the elements of the internal electronic member. The cover 10 is fitted on to the base 9 by complementarity of shape, by clipping in this case, thus enabling the housing 2 to be at least partially closed. According to an embodiment which is not shown, the cover 10 is fitted on to the base 9 by means of screws.

It may be noted that, in the embodiment shown here, the base 9 comprises an outward protrusion 11 from the base. This protrusion 11 enables a screw to be received for fastening the housing 2 on to the vehicle. A plurality of protrusions distributed over the base 9 of the housing 2.

According to the embodiment shown, the first and second shields 6a; 6b are formed in one piece with the cover 10. The first and second shields 6a; 6b can thus be advantageously formed in a single operation for manufacturing the cover 10 and the shields 6a; 6b, particularly by moulding.

The air outlet 5 and the electronic connector 4 each have a substantially polygonal shape.

Figure 5:
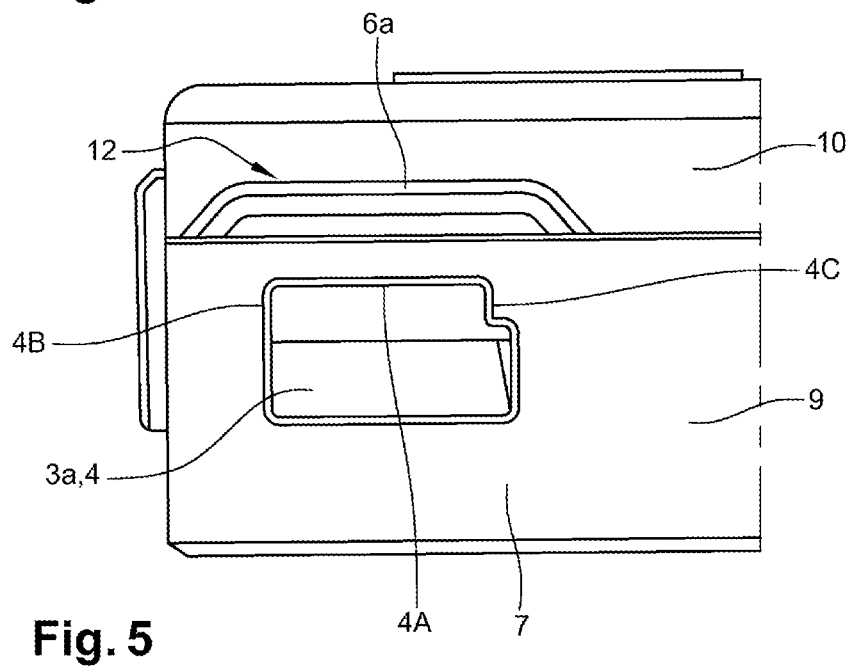
FIG. 5 shows a face-on view of said electronic connector.

It should be noted that, according to the embodiment shown, the first shield 6a surrounds less than half of the periphery of the electronic connector 4, as may be seen in FIG. 5. The first shield 6a surrounds the electronic connector 4 on a main side 4A of said electronic connector 4, in a rectilinear manner. The first shield 6a partially surrounds the electronic connector 4 on two lateral sides 4B; 4C of said electronic connector 4, in the form of a circular arc in this case.

It should also be noted that, according to the embodiment shown, the first shield 6a extends at a distance from the periphery of the electronic connector 4, as may be seen in FIG. 5.

Figure 4:
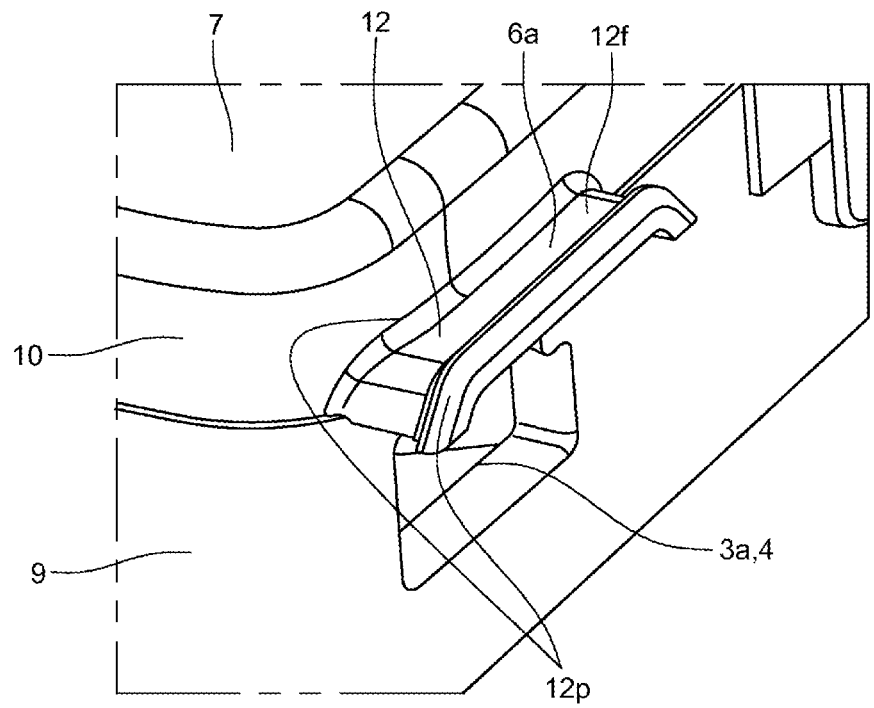
FIG. 4 shows a view of an electronic connector of the sensor.

The first shield 6a comprises a drainage channel 12 formed on the outer face of said shield 6a. The drainage channel is, as may be seen in FIG. 4, U-shaped, and comprises a bottom 12f, notably rounded, and two side walls 12p. The side walls 12p extend in a substantially inclined manner relative to the first opening 3a.

The side walls enable any flows to be concentrated towards the bottom of the drainage channel 12. The drainage channel 12 is open at the ends of the shield 6a, and is thus configured to prevent any retention of water. Each of the inner and outer faces of said shield 6a is thus at least partially concave.

The first shield 6a thus diverts any flows from the electronic connector 4, because of the drainage channel 12.

Figure 3:
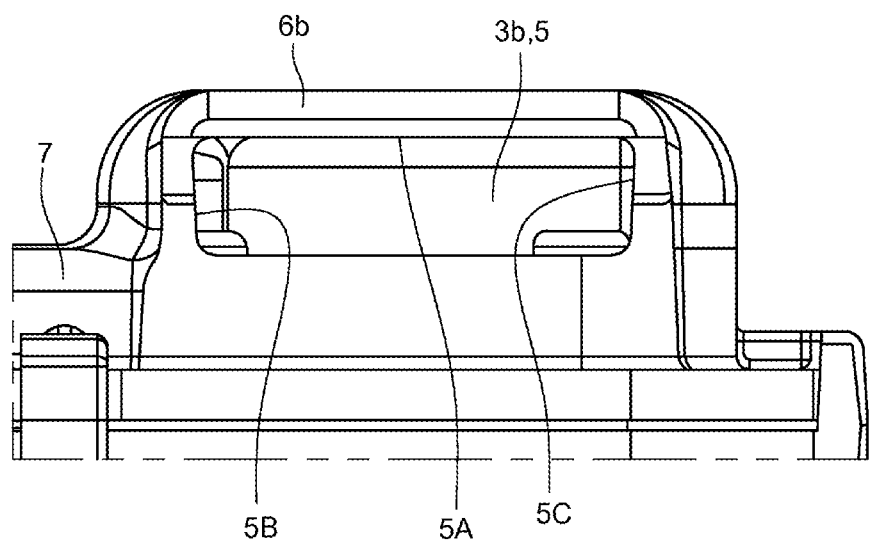
FIG. 3 shows a face-on view of said air outlet.

As may be seen in FIG. 3, the second shield 6b substantially surrounds half of the periphery of the air outlet 5. In a similar manner as for the electronic connector 4, the second shield 6b surrounds the air outlet 5 on a main side 5A of the air outlet 5, in a rectilinear manner. The second shield 6b also partially surrounds the air outlet 5 on two lateral sides 5B; 5C of said air outlet 5, in the form of a circular arc in this case.

As may be seen in FIG. 3, the second shield 6b extends directly over a portion of the periphery of the air outlet 5, unlike the shield 6a which extends at a distance from the periphery of the electronic connector 4. The second shield 6b extends substantially perpendicularly to said air outlet 5.

Figure 2:
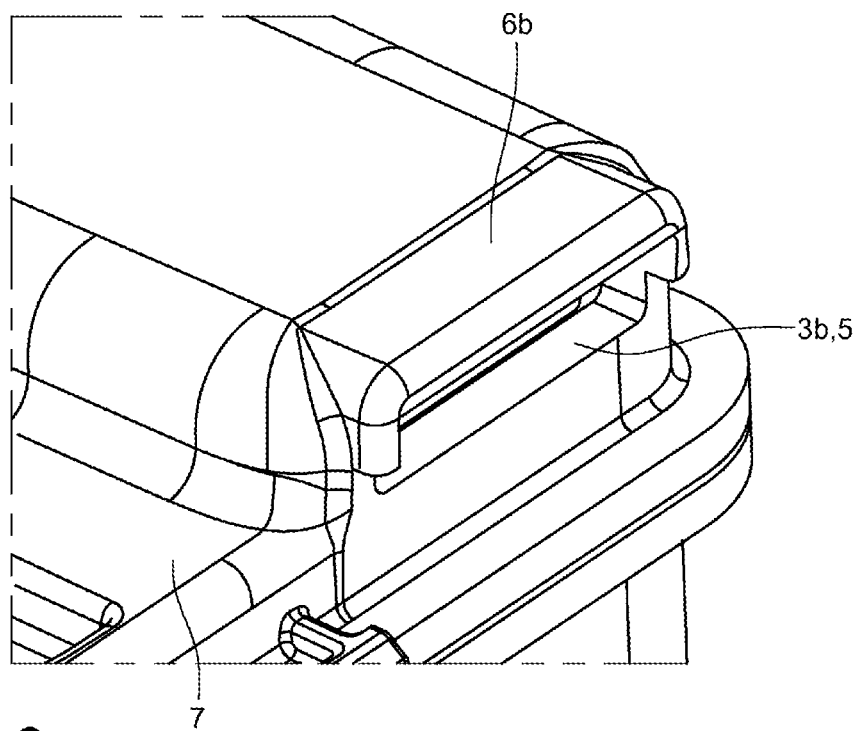
FIG. 2 shows an enlarged view of an air outlet of the sensor.

It should be noted that the second shield 6b is concave on its inner face and convex on its outer face, as may be seen in FIG. 2.

The particulate matter sensor 1 according to the present invention may be, for example, placed on or integrated into a motor vehicle.

It is particularly advantageous for the first and second shields 6a; 6b to be placed substantially above the electronic connector 4 and the air outlet 5 when the particulate matter sensor 1 is in an operational position in the vehicle. Thus the shields 6a; 6b form a screen against bodies descending towards the openings 3a; 3b, protecting them, notably, against gravitational flows.

The invention claimed is:

1. An electronic component for detecting particulate matter, comprising:
   an electronic member;
   a housing in which the electronic member is placed, the housing comprising:
      at least one functional opening, wherein at least one protective shield is arranged on the housing to protect the electronic member from intrusions into the housing of matter consisting of fluids or solids, which could pass through the functional opening, wherein the shield comprises a drainage channel.

2. The electronic component as claimed in claim 1, wherein the shield partially surrounds the periphery of the opening.

3. The electronic component as claimed in claim 1, wherein the shield extends substantially perpendicularly to the opening.

4. The electronic component as claimed in claim 1, wherein the shield extends in an inclined manner relative to the opening.

5. The electronic component as claimed in claim 1, wherein the housing comprises at least one wall which delimits an inside of said housing from an outside, and the shield extends in a projecting manner from said wall.

6. The electronic component as claimed in claim 1, wherein the housing comprises two half-shells, of which one is a base and one is a cover, and the shield is formed in one piece with the cover.

7. The electronic component as claimed in claim 1, wherein the opening allows a fluid to be passed into the housing.

8. The electronic component as claimed in claim 1, wherein the electronic component is a sensor and wherein the opening is an electronic connector.

9. A motor vehicle comprising:
   a sensor for detecting particulate matter, comprising:
     an electronic member,
     a housing in which the electronic member is placed, the housing comprising at least one functional opening and at least one protective shield arranged on the housing to protect the electronic member from intrusions into the housing of matter consisting of fluids or solids, which could pass through the functional opening,
     wherein the shield is substantially above the functional opening when the electronic component is in an operational position in the vehicle, and wherein the shield comprises a drainage channel.

* * * * *